US012763256B2

(12) United States Patent
Shim et al.

(10) Patent No.: US 12,763,256 B2
(45) Date of Patent: Oct. 13, 2026

(54) MULTILAYER ELECTRONIC COMPONENT

(71) Applicant: SAMSUNG ELECTRO-MECHANICS CO., LTD., Suwon-si (KR)

(72) Inventors: Dae Jin Shim, Suwon-si (KR); Jung Jin Park, Suwon-si (KR); Hyo Sung Choi, Suwon-si (KR); Ho Sam Choi, Suwon-si (KR); Seung Yong Lee, Suwon-si (KR); Yong Hwa Lee, Suwon-si (KR); Hyo Sub Kim, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 167 days.

(21) Appl. No.: 18/826,966

(22) Filed: Sep. 6, 2024

(65) Prior Publication Data

US 2025/0157733 A1 May 15, 2025

(30) Foreign Application Priority Data

Nov. 15, 2023 (KR) ........................ 10-2023-0158445

(51) Int. Cl.
*H01G 4/12* (2006.01)
*H01G 4/30* (2006.01)

(52) U.S. Cl.
CPC ............. *H01G 4/1227* (2013.01); *H01G 4/30* (2013.01)

(58) Field of Classification Search
CPC ........ H01G 4/008; H01G 4/12; H01G 4/1209; H01G 4/1227; H01G 4/30
See application file for complete search history.

(56) References Cited

U.S. PATENT DOCUMENTS

2007/0142209 A1 6/2007 Ito et al.
2019/0279817 A1 9/2019 Park et al.
2021/0202180 A1 7/2021 Fukunaga et al.
(Continued)

FOREIGN PATENT DOCUMENTS

JP 2006-062937 A 3/2006
JP 2007-153673 A 6/2007
(Continued)

OTHER PUBLICATIONS

The Extended Search Report dated Feb. 27, 2025 issued in European Patent Application No. 24199253.6.

*Primary Examiner* — Nathan Milakovich
(74) *Attorney, Agent, or Firm* — Morgan, Lewis & Bockius LLP

(57) ABSTRACT

A multilayer electronic component according to an example embodiment of the present disclosure may include: a body including a dielectric layer and internal electrodes; external electrodes disposed on the third and fourth surfaces; and side margin portions disposed on the fifth and sixth surfaces, and the cover portion and the side margin portion may include titanium (Ti) and gallium (Ga), and a ratio (B/A) of the number of moles (B) of gallium (Ga) compared to 100 moles of titanium (Ti) included in the side margin portion to the number of moles (A) of gallium (Ga) compared to 100 moles of titanium (Ti) included in the cover portion may satisfy 1.5≤B/A.

17 Claims, 11 Drawing Sheets

(56) References Cited

U.S. PATENT DOCUMENTS

| | | | | |
|---|---|---|---|---|
| 2022/0177371 | A1 | 6/2022 | Chung et al. | |
| 2024/0379292 | A1* | 11/2024 | Chae | H01G 4/232 |
| 2025/0140482 | A1* | 5/2025 | Lee | C04B 35/4682 |
| 2025/0157743 | A1* | 5/2025 | Park | H01G 4/008 |
| 2025/0166922 | A1* | 5/2025 | Choi | H01G 4/012 |
| 2026/0045412 | A1* | 2/2026 | Choi | H01G 4/1209 |

FOREIGN PATENT DOCUMENTS

| | | | |
|---|---|---|---|
| JP | 2013-173626 | A | 9/2013 |
| JP | 2022-068525 | A | 5/2022 |

* cited by examiner

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

MULTILAYER ELECTRONIC COMPONENT

CROSS-REFERENCE TO RELATED APPLICATION(S)

This application claims benefit of priority to Korean Patent Application No. 10-2023-0158445 filed on Nov. 15, 2023, in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser, mounted on the printed circuit boards of various types of electronic product, such as image display devices including a liquid crystal display (LCD) and a plasma display panel (PDP), computers, smartphones and mobile phones, and serves to charge or discharge electricity therein or therefrom.

The multilayer ceramic capacitor may be used as a component in various electronic devices due to having a small size, ensuring high capacitance and being easily mounted. With the miniaturization and implementation of high output power of various electronic devices such as computers and mobile devices, demand for miniaturization and high capacitance of multilayer ceramic capacitors has also been increasing.

As miniaturization and the implementation of higher capacitance progress, the need to protect a capacitance formation region has increased, but this has been improved by adding a margin region surrounding the capacitance formation region. However, as a structural design continues to change to achieve the miniaturization and the high capacitance, the capacitance formation region may increase and the margin region protecting the capacitance formation region may decrease, and accordingly, there may be a risk that the moisture resistance reliability and strength of a multilayer ceramic capacitor may be decreased.

SUMMARY

An aspect of the present disclosure is to provide a multilayer electronic component having improved moisture resistance reliability.

An aspect of the present disclosure is to provide a multilayer electronic component having improved mechanical properties.

However, the aspects of the present disclosure are not limited to the above-described contents, and may be more easily understood in the process of describing specific example embodiments of the present disclosure.

A multilayer electronic component according to an example embodiment of the present disclosure may include: a body including a capacitance formation portion including a dielectric layer and internal electrodes alternately disposed with the dielectric layer in a first direction, and a cover portion disposed on both end surfaces of the capacitance formation portion in the first direction, the body including first and second surfaces opposing each other in the first direction, third and fourth surfaces connected to the first and second surfaces and opposing each other in a second direction, and fifth and sixth surfaces connected to the first to fourth surfaces and opposing each other in a third direction; an external electrode disposed on the third and fourth surfaces; and a side margin portion disposed on the fifth and sixth surfaces, and the cover portion and the side margin portion may include titanium (Ti) and gallium (Ga), and a ratio (B/A) of a number of moles (B) of gallium (Ga) compared to 100 moles of titanium (Ti) included in the side margin portion to a number of moles (A) of gallium (Ga) compared to 100 moles of titanium (Ti) included in the cover portion may satisfy $1.5 \leq B/A$.

One of the various effects of the present disclosure is to improve moisture resistance reliability of a multilayer electronic component.

One of the various effects of the present disclosure is to improve mechanical properties of a multilayer electronic component.

However, advantages and effects of the present application are not limited to the foregoing content and may be more easily understood in the process of describing a specific example embodiment of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
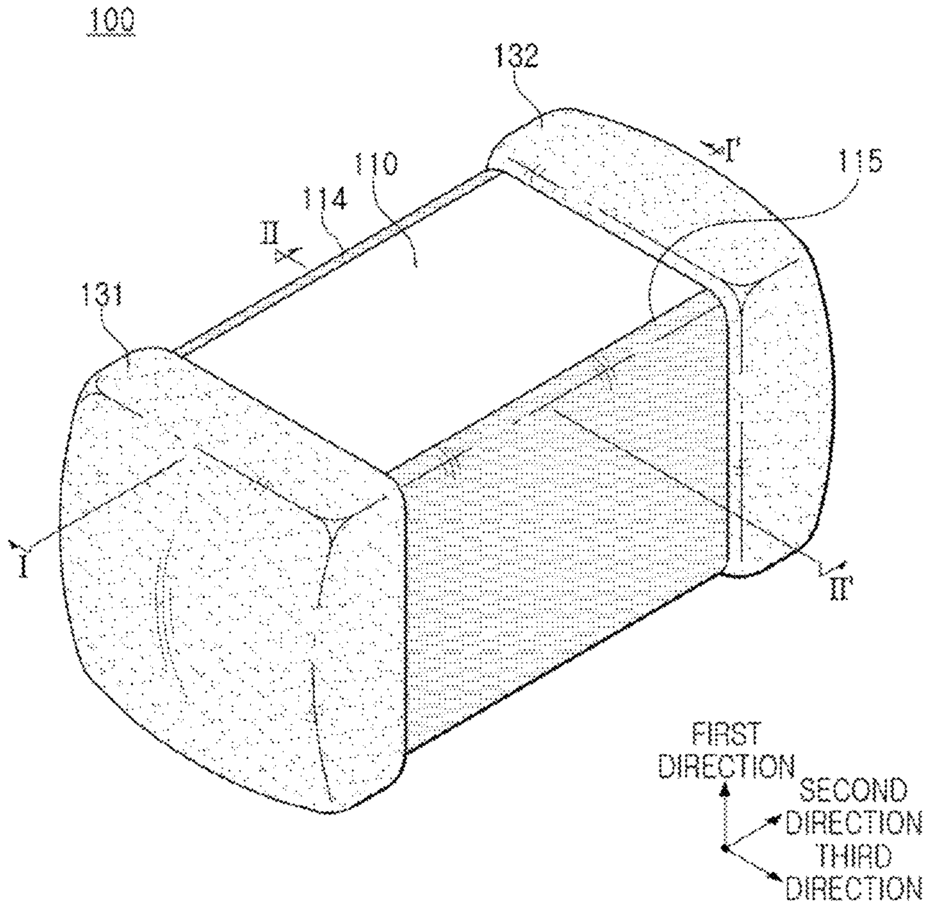
FIG. 1 is a perspective view schematically illustrating a multilayer electronic component according to an example embodiment of the present disclosure.

Hereinafter, example embodiments of the present disclosure will be described with reference to specific example embodiments and the attached drawings. The example embodiments of the present disclosure may, however, be exemplified in many different forms and should not be construed as being limited to the specific embodiments set forth herein. The example embodiments disclosed herein are provided for those skilled in the art to better explain the present disclosure. Therefore, in the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a perspective view schematically illustrating a multilayer electronic component according to an example embodiment of the present disclosure.

Figure 2:
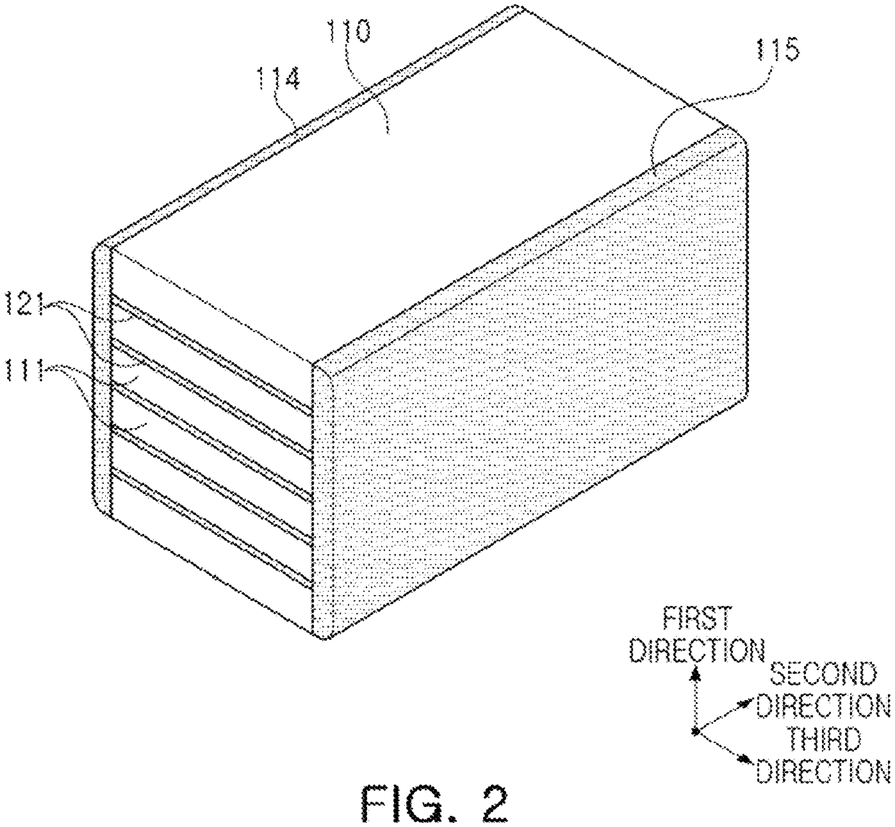
FIG. 2 schematically illustrates a perspective view excluding an external electrode in the multilayer electronic component illustrated in FIG. 1.

FIG. 2 schematically illustrates a perspective view excluding an external electrode in the multilayer electronic component illustrated in FIG. 1.

Figure 3:
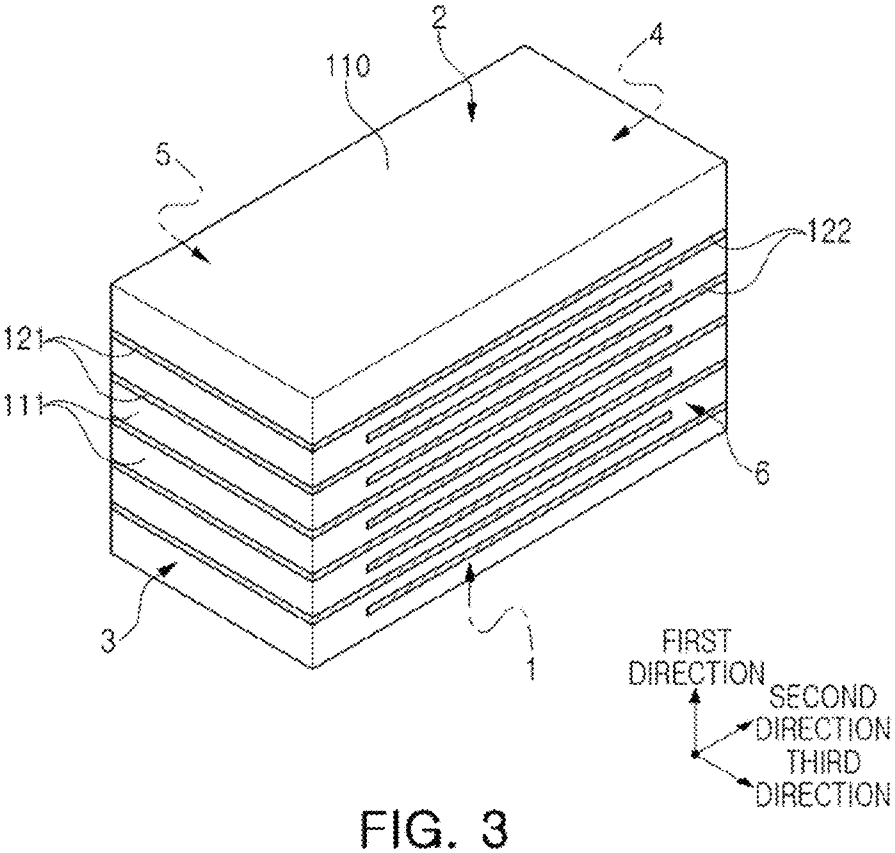
FIG. 3 schematically illustrates a perspective view excluding an external electrode and a side margin portion in the multilayer electronic component illustrated in FIG. 1.

FIG. 3 schematically illustrates a perspective view excluding an external electrode and a side margin portion in the multilayer electronic component illustrated in FIG. 1.

Figure 4:
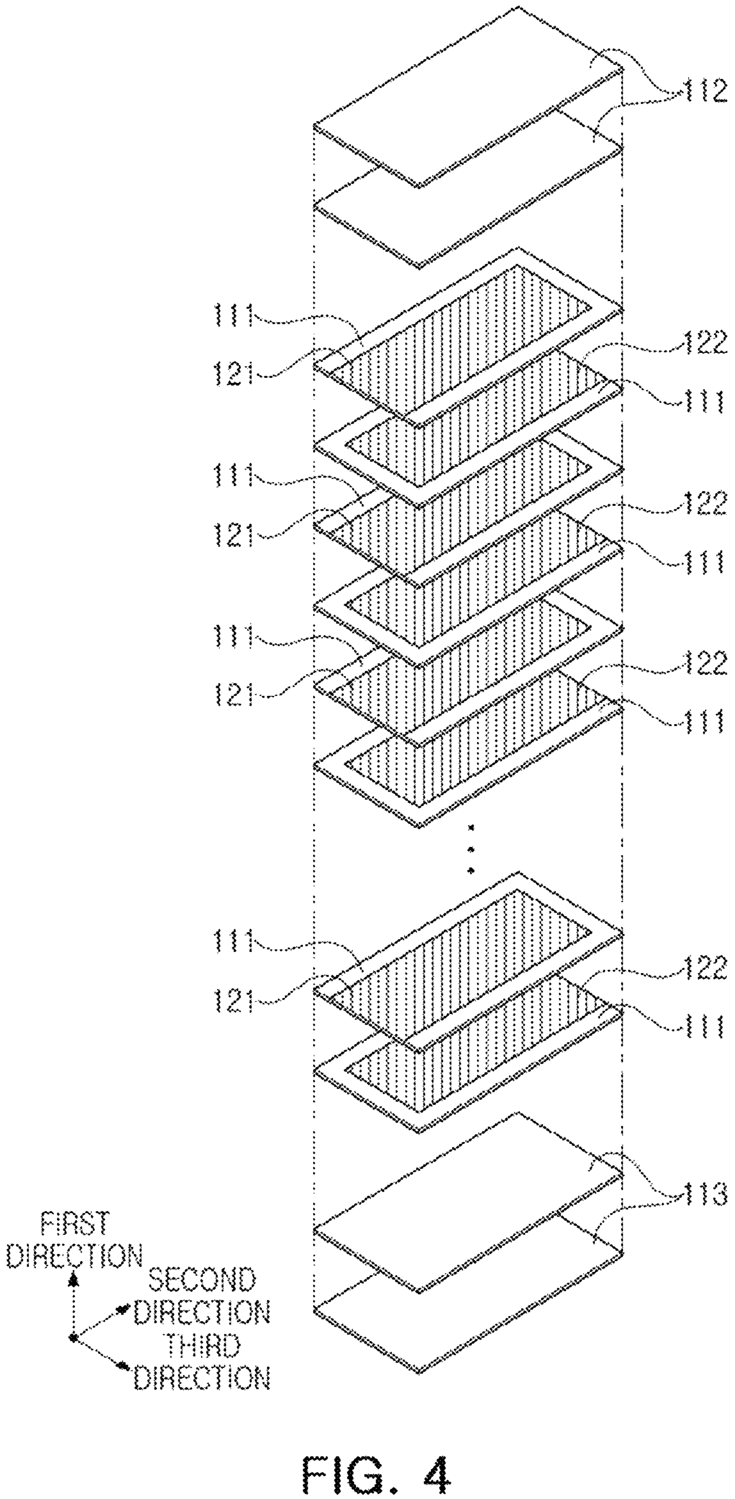
FIG. 4 schematically illustrates an exploded perspective view illustrating a stack structure of internal electrodes.

FIG. 4 schematically illustrates an exploded perspective view illustrating a stack structure of internal electrodes.

Figure 5:
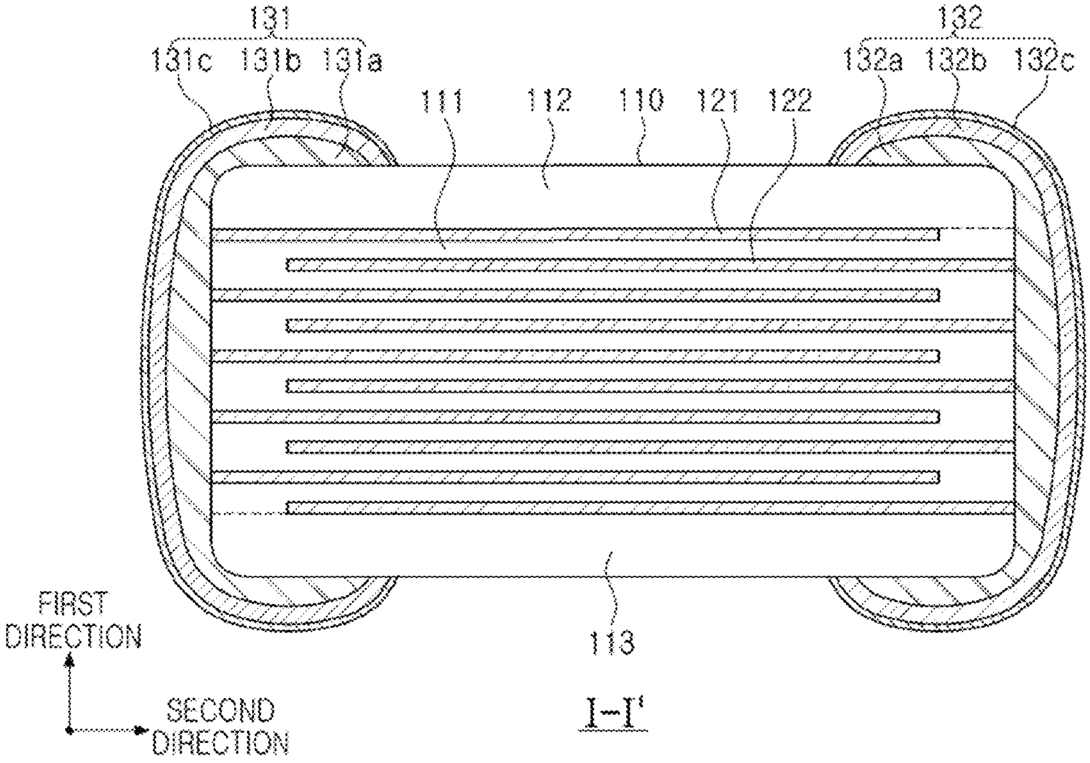
FIG. 5 is a schematic cross-sectional view taken along line I-I' in FIG. 1.

FIG. 5 is a schematic cross-sectional view taken along line I-I' in FIG. 1.

Figure 6:
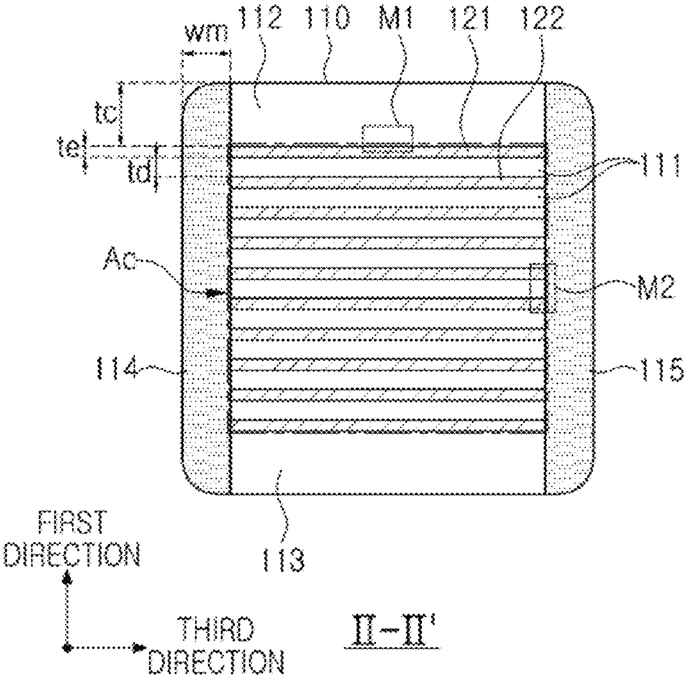
FIG. 6 is a schematic cross-sectional view taken along line II-II' in FIG. 1.

FIG. 6 is a schematic cross-sectional view taken along line II-II' in FIG. 1.

Hereinafter, a multilayer electronic component according to an example embodiment of the present disclosure will be described in detail with reference to FIGS. 1 to 6. However, as an example of a multilayer electronic component, a multilayer ceramic capacitor will be described, but the multilayer electronic component of the present disclosure may also be applied to various electronic products using dielectric compositions, such as inductors, piezoelectric elements, varistors, or thermistors.

A multilayer electronic component 100 according to an example embodiment of the present disclosure may include: a body 110 including a capacitance formation portion Ac including a dielectric layer 111 and internal electrodes 121 and 122 alternately disposed with the dielectric layer 111 in a first direction, and cover portions 112 and 113 disposed on both end surfaces of the capacitance formation portion Ac in the first direction, and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3 and 4 and opposing each other in a third direction; external electrodes disposed on the third and fourth surfaces 3 and 4; and side margin portions 114 and 115 disposed on the fifth and sixth surfaces 5 and 6, and the cover portions 112 and 113 and the side margin portions 114 and 115 include titanium (Ti) and gallium (Ga), and a ratio (B/A) of the number of moles (B) of gallium (Ga) compared to 100 moles of titanium (Ti) included in the side margin portions 114 and 115 to the number of moles (A) of gallium (Ga) compared to 100 moles of titanium (Ti) included in the cover portions 112 and 113 may satisfy $1.5 \leq B/A$.

The body 110 may include dielectric layers 111 and internal electrodes 121 and 122 alternately stacked.

More specifically, the body 110 may include a capacitance formation portion Ac disposed inside the body 110, and including first internal electrodes 121 and second internal electrodes 122 alternately arranged to face each other with the dielectric layer 111 interposed therebetween to form capacitance.

There is no particular limitation on the specific shape of the body 110, but as illustrated, the body 110 may have a hexahedral shape or a shape similar thereto. Due to contraction of ceramic powder particles included in the body 110 during a sintering process, the body 110 may not have a hexahedral shape with entirely straight lines, but may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4 and opposing each other in the third direction.

In a state in which a plurality of dielectric layers 111 included in the body 110 are sintered, boundaries between adjacent dielectric layers 111 may be integrated so as to be difficult to identify without using a scanning electron microscope (SEM).

The materials included in the dielectric layer 111 are not limited as long as sufficient electrostatic capacity may be obtained therewith. In general, a perovskite ($ABO_3$)-based material may be used, and, for example, a barium titanate-based material, a lead composite perovskite-based material, or a strontium titanate-based material may be used. The barium titanate-based material may include $BaTiO_3$-based ceramic particles, and examples of ceramic particles may include $BaTiO_3$, and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1), which is formed by partially employing calcium (Ca) and zirconium (Zr) in $BaTiO_3$.

Additionally, as the materials included in the dielectric layer 111, various ceramic additives, organic solvents, binders, dispersants, and the like, may be added to particles such as barium titanate ($BaTiO_3$) according to the purpose of the present disclosure.

Additionally, the dielectric layer 111 may be formed using a dielectric material such as barium titanate ($BaTiO_3$), and thus may include a dielectric microstructure after sintering. The dielectric microstructure may include a plurality of grains, grain boundaries disposed between the adjacent grains, and a triple point disposed in a point at which three or more grain boundaries are in contact with each other, each of which may be included in plural. The grains, grain boundaries grains, and triple points may be observed by scanning electron microscopy (SEM). Other methods and/or tools appreciated by one of ordinary skill in the art, even if not described in the present disclosure, may also be used.

In the present disclosure, in order to identify dielectric layers included in the cover portions 112 and 113 and the side margin portions 114 and 115, which will be described below, a dielectric layer 111 included in the capacitance formation portion Ac may be defined as a first dielectric layer 111, a dielectric layer included in the cover portions 112 and 113 may be defined as a second dielectric layer, and a dielectric layer included in the side margin portions 114 and 115 may be defined as a third dielectric layer.

In an example embodiment of the present disclosure, the dielectric layer 111 of the capacitance formation portion (Ac) may not include gallium (Ga).

Here, the fact that the dielectric layer 111 of the capacitance formation portion (Ac) does not include gallium (Ga) may denote that a dielectric slurry or dielectric green sheet state does not include gallium (Ga) before sintering the dielectric layer 111, or may denote that the dielectric layer 111 disposed in a center region of the capacitance formation portion Ac does not include gallium (Ga).

That is, as the gallium (Ga) included in the cover portions 112 and 113 or the side margin portions 114 and 115 to be described below undergoes a sintering process such as high temperature heat treatment, gallium (Ga) may diffuse into a region of the dielectric layer 111 of the capacitance formation portion Ac adjacent to the cover portions 112 and 113 or the side margin portions 114 and 115 of the capacitance formation portion (Ac), which may denote that the dielectric layer 111 disposed in the center portion of the capacitance formation portion (Ac) does not include gallium (Ga).

For example, based on the first and second directional cross-sections from a third directional center of the body 110, when a 10 μm×10 μm region disposed in the first and second directional center portions is observed in an Energy Dispersive X-ray Spectrometer (EDS) mode of a scanning electron microscope (SEM), this may denote that gallium (Ga) is not detected, or that gallium (Ga) is detected in an amount of less than 0.1 at %.

A thickness td of the dielectric layer 111 is not limited.

However, in order to achieve high capacitance of the multilayer electronic component, the thickness of the dielectric layer 111 may be 3.0 μm or less, and in order to more easily achieve miniaturization and high capacitance, the thickness of the dielectric layer 111 may be 1.0 μm or less, preferably 0.6 μm or less, and more preferably 0.4 μm or less.

Here, the thickness td of the dielectric layer 111 may refer to a thickness td of the dielectric layer 111 disposed between the first and second internal electrodes 121 and 122.

Meanwhile, the thickness td of the dielectric layer 111 may refer to a first directional size of the dielectric layer 111. Additionally, the thickness td of the dielectric layer 111 may refer to an average thickness td of the dielectric layer 111, and may refer to an average size of the dielectric layer 111 in the first direction.

The average size of the dielectric layer 111 in the first direction may be measured by scanning first and second directional cross-sections of the body 110 with a scanning electron microscope (SEM) of 10,000× magnification. More specifically, the average size of one dielectric layer 111 in the first direction may be an average value calculated by measuring the first directional size of one dielectric layer 111 at 30 points spaced apart from each other at equal intervals in the second direction in the scanned image. The 30 points spaced apart from each other at equal intervals may be designated in the capacitance formation portion Ac. Additionally, when the average value is measured by extending an average value measurement up to 10 dielectric layers 111, an average thickness of the dielectric layers 111 in the first directional may be further generalized The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately arranged to face each other with the dielectric layer 111 included in the body 110 interposed therebetween, and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body 110 and may be connected to the first internal electrode 121, and a second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

Meanwhile, the body 110 may be formed by alternately stacking ceramic green sheets on which the first internal electrode 121 is printed and ceramic green sheets on which the second internal electrode 122 are printed, and then sintering the ceramic green sheets.

The material included in the internal electrodes 121 and 122 is not particularly limited, and any material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Additionally, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti) and alloys thereof on a ceramic green sheet. A printing method for the conductive paste for internal electrodes may be a screen-printing method or a gravure printing method, but the present disclosure is not limited thereto.

Meanwhile, a thickness te of the internal electrodes 121 and 122 is not limited.

However, in order to achieve high capacitance of the multilayer electronic component, the thickness of the internal electrodes 121 and 122 may be 1.0 μm or less, and in order to more easily achieve the miniaturization and the high capacitance, the thickness of the internal electrodes 121 and 122 may be 0.6 μm or less, and more preferably 0.4 μm or less.

Here, the thickness te of the internal electrodes 121 and 122 may refer to a first directional size of the internal electrodes 121 and 122. Additionally, the thickness te of the internal electrodes 121 and 122 may refer to an average thickness te of the internal electrodes 121 and 122, and may refer to an average size of the internal electrodes 121 and 122 in the first direction.

The average size of the internal electrodes 121 and 122 in the first direction may be measured by scanning images of the first and second directional cross-sections of the body 110 with a scanning electron microscope (SEM) of 10,000× magnification. More specifically, the average size of one internal electrode in the first direction may be an average value calculated by measuring the first directional size of one internal electrode at 30 points spaced apart from each other at equal intervals in the second direction in the scanned image. The 30 points spaced apart from each other at equal intervals may be designated in the capacitance formation portion Ac. Additionally, when the average value is measured by extending an average value measurement up to 10 internal electrodes 121 and 122, an average thickness of the internal electrodes 121 and 122 in the first directional may be further generalized.

Meanwhile, in an example embodiment of the present disclosure, the average thickness td of at least one of the plurality of dielectric layers 111 and the average thickness te of at least one of the plurality of internal electrodes 121 and 122 may satisfy 2×te<td.

In other words, the average thickness td of one dielectric layer 111 may be larger than twice the average thickness te of one internal electrode 121 or 122. Preferably, the average thickness td of the plurality of dielectric layers 111 may be larger than twice the average thickness te of the plurality of internal electrodes 121 and 122.

In general, high-voltage electronic components have a major issue due to reliability issues due to a decrease in breakdown voltage (BDV) in a high-voltage environment.

Accordingly, in order to prevent a decrease in the breakdown voltage under a high voltage environment, the average thickness td of the dielectric layer 111 may be formed to be larger than twice the average thickness te of the internal electrodes 121 and 122, so that the thickness of the dielectric layer, which is a distance between internal electrodes, may be increased, thereby improving the breakdown voltage (BDV) characteristics.

When the average thickness td of the dielectric layer 111 is less than or equal to twice the average thickness te of the internal electrodes 121 and 122, an average thickness of the dielectric layer, which is a distance between the internal electrodes, may be thin, which may reduce the breakdown voltage, and a short circuit may occur between the internal electrodes.

In high-voltage electronic components, the average thickness te of the internal electrodes may be 1 μm or less, and the average thickness td of the dielectric layer may be 3.0 μm or less, but the present disclosure are not necessarily limited thereto.

Meanwhile, the body 110 may include cover portions 112 and 113 disposed on both end surfaces of the capacitance formation portion Ac in the first direction.

Specifically, the body 110 may include a first cover portion 112 disposed on one surface of the capacitance formation portion Ac in the first direction, and a second cover portion 113 disposed on the other surface of the capacitance formation portion Ac in the first direction, and more specifically, the body 110 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by stacking a single dielectric layer 111 or two or more dielectric layers 111 on upper and lower surfaces of the capacitance formation portion Ac in the first direction, respectively, and may basically serve to prevent damage to the internal electrodes 121 and 122 due to physical or chemical stress.

The upper cover portion 112 and the lower cover portion 113 do not include the internal electrodes 121 and 122 and may include the same dielectric material as the first dielectric layer 111. That is, the upper cover portion 112 and the lower cover portion 113 may include a ceramic material, and may include, for example, barium titanate ($BaTiO_3$) based ceramic material.

However, a composition of the second dielectric layer may be different from a composition of the first dielectric layer 111. For example, the second dielectric layer may include gallium (Ga).

That is, the cover portions 112 and 113 may include gallium (Ga).

Since the cover portions 112 and 113 include gallium (Ga), the number of pores (P) may be reduced by lowering the sintering temperature, so that the densification of the cover portions 112 and 113 may be improved, thereby improving moisture resistance reliability. Additionally, the generation of cracks may be suppressed even when the cover portions 112 and 113 are subjected to external shocks, thereby improving mechanical properties.

Additionally, the second dielectric layer may be formed using a dielectric material such as barium titanate ($BaTiO_3$), and thus may include a dielectric microstructure after sintering. The dielectric microstructure may include a plurality of grains, grain boundaries disposed between the adjacent grains, and a triple point disposed in a point at which three or more grain boundaries are in contact with each other, each of which may be included in plural.

Meanwhile, the thickness tc of the cover portions 112 and 113 is not limited.

However, in order to more easily achieve the miniaturization and the high capacitance of the multilayer electronic component, the thickness tc of the cover portions 112 and 113 may be 100 μm or less, preferably 30 μm or less, and more preferably 20 μm or less in ultra-small products.

Here, the thickness tc of the cover portions 112 and 113 may refer to a first directional size of the cover portions 112 and 113 in the first direction. Additionally, the thickness tc of the cover portions 112 and 113 may refer to the average thickness tc of the cover portions 112 and 113, and may refer to an average size of the cover portions 112 and 113 in the first direction.

The average size of the cover portions 112 and 113 in the first direction may be measured by scanning images of the first and second directional cross-sections of the body 110 with a scanning electron microscope (SEM) of 10,000× magnification. More specifically, the average size thereof may refer to an average value calculated by measuring the first directional size at 30 points equally spaced from each other in the second direction in the image obtained by scanning one cover portion.

Additionally, the average size of the cover portion in the first direction measured by the above-described method may have substantially the same size as the average size of the cover portion in the first direction in the first and third directional cross-sections of the body 110.

Meanwhile, the multilayer electronic component 100 may include side margin portions 114 and 115 disposed on both third directional end surfaces of the body 110.

More specifically, the side margin portions 114 and 115 may include a first side margin portion 114 disposed on the fifth surface 5 of the body 110 and a second side margin portion 115 disposed on the sixth surface 6 of the body 110. That is, the side margin portions 114 and 115 may be disposed on both end surfaces of the body 110 in the third direction.

As illustrated, the side margin portions 114 and 115 may refer to a region between both ends of the first and second internal electrodes 121 and 122 in the third direction and a boundary surface of the body 110, based on the first and third directional cross-sections of the body 110.

The side margin portions 114 and 115 may basically serve to prevent damage to the internal electrodes 121 and 122 due to physical or chemical stress.

The side margin portions 114 and 115 may formed by applying a conductive paste to form the internal electrodes 121 and 122 except where the side margin portions 114 and 115 are to be formed on the ceramic green sheet, and cutting the stacked internal electrodes 121 and 122 so that the internal electrodes 121 and 122 are exposed to the fifth and sixth surfaces 5 and 6 of the body 110 in order to suppress a step portion caused by the internal electrodes 121 and 122, and then stacking a single third dielectric layer or two or more third dielectric layers on both third directional end surfaces of the capacitance formation portion Ac.

The first side margin portion 114 and the second side margin portion 115 do not include the internal electrodes 121 and 122 and may include the same dielectric material as the first dielectric layer 111. That is, the first side margin portion 114 and the second side margin portion 115 may include a ceramic material, may include, for example, a barium titanate ($BaTiO_3$)-based ceramic material.

However, a composition of the third dielectric layer may be different from a composition of the first dielectric layer 111. For example, the third dielectric layer may include gallium (Ga).

That is, the side margin portions 114 and 115 may include gallium (Ga).

Since the side margin portions 114 and 115 include gallium (Ga), the number of pores (P) may be reduced by lowering a sintering temperature, so that the densification of the side margin portions 114 and 115 may be improved, thereby improving moisture resistance reliability. Additionally, the generation of cracks may be suppressed even when the side margin portions 114 and 115 are subjected to external shock, thereby improving mechanical properties.

Additionally, the third dielectric layer may be formed using a dielectric material such as barium titanate ($BaTiO_3$), and may include a dielectric microstructure after sintering. The dielectric microstructure may include a plurality of grains, grain boundaries disposed between the adjacent grains, and a triple point disposed at a point at which three or more grain boundaries are in contact with each other, each of which may be included in plural.

Meanwhile, a width wm of the first and second side margin portions 114 and 115 is not limited.

However, in order to more easily achieve the miniaturization and the high capacitance of the multilayer electronic component 100, the width wm of the side margin portions 114 and 115 may be 100 μm or less, preferably 30 μm or less, and more preferably 20 μm or less in ultra-small products.

Here, the width wm of the side margin portions 114 and 115 may refer to a third directional size of the side margin portions 114 and 115. Additionally, the width wm of the side margin portions 114 and 115 may refer to the average width wm of the side margin portions 114 and 115, and may refer to an average size of the side margin portions 114 and 115 in the third direction.

The average size of the side margin portions 114 and 115 in the third direction may be measured by scanning images of the first and third directional cross-sections of the body 110 with the scanning electron microscope (SEM) of 10,000× magnification. More specifically, the average size thereof may refer to an average value calculated by measuring a third directional size at 10 points equally spaced from each other in the first direction in an image obtained by scanning one side margin portion.

Hereinafter, an embodiment of the present invention will be described in more detail.

In an example embodiment of the present disclosure, a ratio (B/A) of the number of moles (B) of gallium (Ga) compared to 100 moles of titanium (Ti) included in the side margin portions 114 and 115 to the number of moles (A) of gallium (Ga) compared to 100 moles of titanium (Ti) included in the cover portions 112 and 113 may satisfy $1.5 \leq B/A$.

As the ratio (B/A) of the number of moles of gallium (Ga) to 100 moles of titanium (Ti) included in the cover portions 112 and 113 and the side margin portions 114 and 115 satisfies $1.5 \leq B/A$, the number of pores (P) may be reduced by lowering the sintering temperature of the cover portions 112 and 113 and the side margin portions 114 and 115, so that the densification of the cover portions 112 and 113 and the side margin portions 114 and 115 may be improved, thereby improving moisture resistance reliability. Additionally, the formation of cracks can be suppressed even when the cover portions 112 and 113 and the side margin portions 114 and 115 are subjected to external shocks, thereby improving mechanical properties.

Additionally, since gallium (Ga) enables low-temperature sintering, non-grain growth of grains may be suppressed to reduce the size of the grains and enable uniform growth, thereby improving grain size distribution. Accordingly, the number of pores (P) may be reduced, and the breakdown voltage (BDV) caused by electric field concentration may be improved.

On the other hand, in order to control the number of pores (P), an upper limit value of the ratio (B/A) of gallium (Ga) included in the cover portions 112 and 113 and the side margin portions 114 and 115 is not particularly limited, but may be 10.0 or less, and in other words, the upper limit value may satisfy $B/A \leq 10.0$.

When the ratio (B/A) of the number of moles of gallium (Ga) to 100 moles of titanium (Ti) included in the cover portions 112 and 113 and the side margin portions 114 and 115 is $B/A<1.5$, the number of target pores (P) may increase to deteriorate moisture resistance reliability, and the internal electrodes 121 and 122 forming the capacitance may not be sufficiently protected due to a decrease in mechanical strength.

In this case, the number of moles (A) of gallium (Ga) compared to 100 moles of titanium (Ti) included in the cover portions 112 and 113 may be more than 0 mole and 1.0 mole or less. In other words, 0 mole$<A\leq$1.0 mole may be satisfied.

As the number of moles (A) of gallium (Ga) compared to 100 moles of titanium (Ti) included in the cover portions 112 and 113 satisfies 0 mole$<A\leq$1.0 mole, the number of pores (P) may be reduced by lowering the sintering temperature of the cover portions 112 and 113, so that the densification of the cover portions 112 and 113 may be improved, thereby improving moisture resistance reliability. Additionally, the formation of cracks may be suppressed even when the cover portions 112 and 113 are subjected to external shocks, thereby improving mechanical properties.

On the other hand, when the number of moles (A) of gallium (Ga) compared to 100 moles of titanium (Ti) included in the cover portions 112 and 113 is more than 1.0 mole (1.0 mole$<A$), excessive addition of gallium (Ga) may cause agglomerates to occur, which may result in a decrease in the breakdown voltage (BDV), or grain growth may be excessively suppressed, which may result in side effects such as lowered densification and lowered mechanical strength.

Meanwhile, the number of moles (B) of gallium (Ga) compared to 100 moles of titanium (Ti) included in the side margin portions 114 and 115 may be more than 0 mole and 1.0 mole or less. In other words, 0 mole$<B\leq$1.0 mole may be satisfied.

As the number of moles (B) of gallium (Ga) compared to 100 moles of titanium (Ti) included in the side margin portions 114 and 115 satisfies 0 mole$<B\leq$1.0 mole, the number of pores (P) may be reduced by lowering the sintering temperature of the side margin portions 114 and 115, so that the densification of the side margin portions 114 and 115 may be improved, thereby improving moisture resistance reliability. Additionally, the formation of cracks may be suppressed even when the side margin portions 114 and 115 are subjected to external shock, thereby improving mechanical properties.

On the other hand, when the number of moles (B) of gallium (Ga) compared to 100 moles of titanium (Ti) included in the side margin portions 114 and 115 is more than 1.0 mole (1.0 mole$<B$), excessive addition of gallium (Ga) may cause agglomerates to occur, which may result in a decrease in the breakdown voltage (BDV), or grain growth may be excessively suppressed, which may result in side effects such as lowered densification and lowered mechanical strength.

In an example embodiment of the present disclosure, the cover portions 112 and 113 may include a secondary phase including gallium (Ga), and in this case, the secondary phase may be disposed in the triple point of the cover portions 112 and 113.

As the secondary phase included in the cover portions 112 and 113 includes gallium (Ga), the number of pores (P) in the cover portions 112 and 113 may be reduced and the densification may be improved, thereby improving moisture resistance reliability, and the formation of cracks may be suppressed even when the cover portions 112 and 113 are subjected to external shocks, thereby improving mechanical properties.

In the present disclosure, "secondary phase" may refer to particles or a region of segregation having a different composition from the perovskite-based ($ABO_3$) dielectric particles. Specifically, an atomic percentage (at %) of barium (Ba) in the secondary phase particles may be greater than 0 at % and 30.0 at % or less, an atomic percentage (at %) of titanium (Ti) in the secondary phase particles may be greater than 0 at % and 30.0 at % or less, an atomic percentage (at %) of silicon (Si) in the secondary phase particles may be greater than 0 at % and 15.0 at % or less, an atomic percentage (at %) of aluminum (Al) in the secondary phase particles may be greater than 0 at % and 15.0 at % or less, and the secondary phase may refer to particles satisfying all of the atomic percentage (at %) conditions of barium (Ba), titanium (Ti), silicon (Si), and aluminum (Al).

In the present disclosure, as an example of a more specific method of measuring the content of elements included in each component of the multilayer electronic component 100, in the case of destruction method, components may be analyzed using an EDS mode of the scanning electron microscopy (SEM), an EDS mode of a transmission electron microscope (TEM), or an EDS mode of a scanning transmission electron microscope (STEM). First, a thinly sliced analysis sample is prepared using a focused ion beam (FIB) device in a region including dielectric microstructures, in cross-sections of a sintered body or a sintered side margin portion. Then, a damaged layer on a surface of the thinly sliced analysis sample is removed using xenon (Xe) or argon (Ar) ion milling, and then, qualitative/quantitative analysis is performed by mapping each component to be measured in an image obtained using SEM-EDS, TEM-EDS, or STEM-EDS. In this case, the qualitative/quantitative analysis graph of each component may be expressed in terms of mass percentage (wt %), atomic percentage (at %), or mole percentage (mol %) of each element.

Through another method, a chip may be crushed and a region including the dielectric microstructures may be selected, and in a region including the selected dielectric microstructures, the components of the region including the dielectric microstructures may be analyzed using devices such as inductively coupled plasma spectroscopy (ICP-OES) and inductively coupled plasma mass spectrometry (ICP-MS). Other methods and/or tools appreciated by one of ordinary skill in the art, even if not described in the present disclosure, may also be used.

Additionally, in an example embodiment of the present disclosure, the secondary phase included in the cover portions 112 and 113 may include glass, and may include, for example, silicon (Si)-based glass, or aluminum (Al)-silicon (Si)-based glass.

As the secondary phase included in the cover portions 112 and 113 includes glass, the secondary phase may be more easily formed due to glass, and the secondary phase may further include elements other than gallium (Ga), for example, silicon (Si), or aluminum (Al), and elements other than gallium (Ga), for example, rare earth elements such as dysprosium (Dy), or minor components such as magnesium (Mg) and tin (Sn) elements, are not dissolved in barium titanate ($BaTiO_3$)-based dielectric material and may be included in the secondary phase.

Additionally, the secondary phase included in the side margin portions 114 and 115 may include glass, and may include, for example, silicon (Si)-based glass, or aluminum (Al)-silicon (Si)-based glass.

As the secondary phase included in the side margin portions 114 and 115 includes glass, the secondary phase may be more easily formed due to the glass, and the secondary phase may further include elements other than gallium (Ga), for example, silicon (Si), or aluminum (Al), and elements other than gallium (Ga), for example, rare earth elements such as dysprosium (Dy) or tin (Sn) elements, are not dissolved in barium titanate ($BaTiO_3$)-based dielectric material and may be included in the secondary phase.

In an example embodiment of the present disclosure, the grain boundaries included in the cover portions 112 and 113 may include gallium (Ga).

As the grain boundaries of the cover portions 112 and 113 include gallium (Ga), the number of pores (P) may be reduced by lowering the sintering temperature, so that the densification of the cover portions 112 and 113 may be improved, thereby improving moisture resistance reliability. Additionally, the formation of cracks may be suppressed even when the cover portions 112 and 113 are subjected to external shocks, thereby improving mechanical properties.

In this case, the grain boundaries of the cover portions 112 and 113 may include a region in which the atomic percentage (at %) of gallium (Ga) is 2.0 at % or more, and an upper limit value thereof is not particularly limited, but may be, for example, 4.0 at % or less.

As the grain boundaries of the cover portions 112 and 113 include the region in which the atomic percentage (at %) of gallium (Ga) is 2.0 at % or more, the number of pores (P) may be reduced by lowering the sintering temperature, so that the densification of the cover portions 112 and 113 may be improved, thereby improving moisture resistance reliability. Additionally, the formation of cracks may be suppressed even when the cover portions 112 and 113 are subjected to external shocks, thereby improving mechanical properties.

Additionally, the average atomic percentage (at %) of gallium (Ga) included in the grain boundaries of the cover portions 112 and 113 may be 0.5 at % or more and 2.0 at % or less.

As the average atomic percentage (at %) of gallium (Ga) included in the grain boundaries of the cover portions 112 and 113 satisfies 0.5 at % or more and 2.0 at % or less, the number of pores (P) may be reduced by lowering the sintering temperature, so that the densification of the cover portions 112 and 113 may be improved, thereby improving moisture resistance reliability. Additionally, the formation of cracks may be suppressed even when the cover portions 112 and 113 are subjected to external shocks, thereby improving mechanical properties.

Here, a method of measuring the atomic percentage (at %) of gallium (Ga) included in the grain boundaries of the cover portions 112 and 113 is not particularly limited, but the EDS analysis method may be used as described above. An EDS analysis position may be confirmed by measuring points of the grain boundaries, or may be obtained using a line-profile in the direction, perpendicular to the grain boundary, and the atomic percentage (at %) of gallium (Ga) may be confirmed from the measured line-profile. Other methods and/or tools appreciated by one of ordinary skill in the art, even if not described in the present disclosure, may also be used. The measured atomic percentage may be based on a total amount of atoms present in the analyzed position. The average atomic percentage may be an average of the atomic percentage measured at different points in the grain boundary.

Similarly, in an example embodiment of the present disclosure, the grain boundaries included in the side margin portions 114 and 115 may include gallium (Ga).

As the grain boundaries of the side margin portions 114 and 115 include gallium (Ga), the number of pores (P) may be reduced by lowering the sintering temperature, so that the densification of the side margin portions 114 and 115 may be improved, thereby improving moisture resistance reliability. Additionally, the formation of cracks may be suppressed even when the side margin portions 114 and 115 are subjected to external shocks, thereby improving mechanical properties.

In this case, the grain boundaries of the side margin portions 114 and 115 may include a region in which the atomic percentage (at %) of gallium (Ga) is 2.0 at % or more, and an upper limit value thereof is not particularly limited, but may be, for example, 4.0 at % or less.

As the grain boundaries of the side margin portions 114 and 115 include the region in which the atomic percentage (at %) of gallium (Ga) is 2.0 at % or more, the number of pores (P) may be reduced by lowering the sintering temperature, so that the densification of the side margin portions 114 and 115 may be improved, thereby improving moisture resistance reliability. Additionally, the formation of cracks may be suppressed even when the side margin portions 114 and 115 are subjected to external shocks, thereby improving mechanical properties.

Additionally, the average atomic percentage (at %) of gallium (Ga) included in the grain boundaries of the side margin portions 114 and 115 may be more than 0.5 at % and 2.0 at % or less.

As the average atomic percentage (at %) of gallium (Ga) included in the grain boundaries of the side margin portions 114 and 115 satisfies 0.5 at % or more and 2.0 at % or less, the number of pores (P) may be reduced by lowering the sintering temperature, so that the densification of the side margin portions 114 and 115 may be improved, thereby improving moisture resistance reliability. Additionally, the formation of cracks may be suppressed even when the side margin portions 114 and 115 are subjected to external shocks, thereby improving mechanical properties.

Here, a method of measuring the atomic percentage (at %) of gallium (Ga) included in the grain boundaries of the side margin portions 114 and 115 is not particularly limited, but the EDS analysis method may be used as described above. The EDS analysis position may be confirmed by measuring the points of the grain boundaries, or may be obtained by measuring the line-profile in the direction, perpendicular to the grain boundary, and the atomic percentage (at %) of gallium (Ga) may be confirmed from the element(s) of the measured line-profile.

In an example embodiment of the present disclosure, in the cover portions 112 and 113, the number of pores (P) included in 1 $\mu m^2$ may be 0.30 or less based on a cross-section, the number of pores (P) included in 1 $\mu m^2$ may be, preferably, 0.25 or less, and the number of pores (P) included in 1 $\mu m^2$ may be, preferably, 0.21 or less.

A method of measuring the number of pores (P) is not particularly limited, but taking FIG. 6 as an example, based on the first and third directional cross-sections of the multilayer electronic component 100, after capturing an image of region M1 including the cross-section of the first cover portion 112 using the scanning electron microscope (SEM), the number of pores (P) in an area of, for example, 500 $\mu m^2$, may be measured using a program that may measure pores (P). The number of pores (P) included in 1 $\mu m^2$ may then be calculated.

Additionally, in an example embodiment of the present disclosure, in the side margin portions 114 and 115, the number of pores (P) included in 1 μm$^2$ may be 0.22 or less, and the number of pores (P) included in 1 μm$^2$ may be 0.21 or less.

The method of measuring the number of pores (P) is not particularly limited, but taking FIG. 6 as an example, based on the first and third directional cross-sections of the multilayer electronic component 100, after capturing an image of region M2 including the cross-section of the second side margin portion 115 using the scanning electron microscope (SEM), the number of pores (P) may be measured using the program that may measure pores (P). Other methods and/or tools appreciated by one of ordinary skill in the art, even if not described in the present disclosure, may also be used.

In an example embodiment of the present disclosure, a structure in which a ceramic electronic component 100 has two external electrodes 131 and 132 is described, but the number or shape of the external electrodes 131 and 132 may be changed depending on the shape of the internal electrodes 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

Additionally, the external electrodes 131 and 132 may be disposed to extend to a portion of the first and second surfaces 1 and 2 of the body 110, and may also be disposed to extend to a portion of the fifth and sixth surfaces 5 and 6 of the body 110. That is, the first external electrode 131 may be disposed on a portion of the first, second, fifth, and sixth surfaces 1, 2, 5 and 6 of the body 110 and disposed on the third surface 3 of the body 110, and the second external electrode 132 may disposed on a portion of the first, second, fifth and sixth surfaces 1, 2, 5 and 6 of the body 110 and disposed on the third surface 3 of the body 110.

Meanwhile, the external electrodes 131 and 132 may be formed using any material as long as the material has electrical conductivity, such as a metal, and the specific material may be determined in consideration of electrical properties, structural stability, and the like, and the external electrodes 131 and 132 may further have a multilayer structure.

For example, the external electrodes 131 and 132 may include an electrode layer disposed on the body 110 and a plating layer disposed on the electrode layer.

For a more specific example of the electrode layer, the electrode layer may include first electrode layers 131*a* and 132*a*, sintered electrodes including a first conductive metal and glass, or may include second electrode layers 131*b* and 132*b*, resin-based electrodes including a second conductive metal and resin.

Here, a first conductive metal may refer to a conductive metal included in the first electrode layers 131*a* and 132*a*, and a second conductive metal may refer to a conductive metal included in the second electrode layers 131*b* and 132*b*. In this case, the first conductive metal and the second conductive metal may be identical to or different from each other, and when including a plurality of metal materials, at least one metal material may be the same, but the present disclosure is not particularly limited thereto.

Additionally, the electrode layers 131*a*, 132*a*, 131*b* and 132*b* may be formed by sequentially forming the first electrode layers 131*a* and 132*a* and the second electrode layers 131*b* and 132*b* on the body, and may be formed by transferring a sheet including a conductive metal onto the body, or may be formed by transferring a sheet including the conductive metal onto the sintering electrode.

The material having excellent electrical conductivity may be used as first and second conductive metals included in the electrode layers 131*a*, 132*a*, 131*b* and 132*b*, and for example, the first and second conductive metals may include one or more selected from the group consisting of nickel (Ni), copper (Cu), palladium (Pd), silver (Ag), gold (Au), platinum (Pt), tin (Sn), tungsten (W), titanium (Ti) and alloys thereof, but the present disclosure is not particularly limited thereto.

In an example embodiment of the present disclosure, the electrode layers 131*a*, 132*a*, 131*b* and 132*b* may have a bilayer structure including the first electrode layers 131*a* and 132*a* and the second electrode layers 131*b* and 132*b*, and thus, the external electrodes 131 and 132 may include the first electrode layers 131*a* and 132*a* including a first conductive metal and glass, and the second electrode layers 131*b* and 132*b* disposed on the first electrode layers 131*a* and 132*a* and including a second conductive metal and resin.

The first electrode layers 131*a* and 132*a* may serve to improve adhesion to the body 110 by including glass, and the second electrode layers 131*b* and 132*b* may serve to improve bending strength by including a resin.

The conductive metal used in the first electrode layers 131*a* and 132*a* is not particularly limited as long as the conductive metal has a material that may be electrically connected to the internal electrodes 121 and 122 to form electric capacity, and the conductive metal may include, for example, one or more selected from the group consisting of nickel (Ni), copper (Cu), palladium (Pd), silver (Ag), gold (Au), platinum (Pt), tin (Sn), tungsten (W), titanium (Ti) and alloys thereof. The first electrode layers 131*a* and 132*a* may be formed by applying a conductive paste prepared by adding glass frit to the first conductive metal particles and then sintering the conductive paste.

The second conductive metal included in the second electrode layers 131*b* and 132*b* may serve to electrically connect to the first electrode layers 131*a* and 132*a*.

The conductive metal included in the second electrode layers 131*b* and 132*b* is not particularly limited as long as the conductive metal has a material that may be electrically connected to the electrode layers 131*a* and 132*a*, and the conductive metal may include one or more selected from the group consisting of nickel (Ni), copper (Cu), palladium (Pd), silver (Ag), gold (Au), platinum (Pt), tin (Sn), tungsten (W), titanium (Ti) and alloys thereof.

The conductive metal included in the second electrode layers 131*b* and 132*b* may include one or more of spherical particles and flake-shaped particles. That is, the conductive metal may consist only of flake-shaped particles or only spherical particles, and may be a mixture of flake-shaped particles and spherical particles. Here, the spherical particle may include a shape that is not completely spherical, for example, a shape in which a length ratio of a major axis and a minor axis (major axis/minor axis) is 1.45 or less. The flake-shaped particles may refer to particles with a flat and elongated shape, and the present disclosure is not particularly limited thereto, but the length ratio of the major axis and the minor axis (major axis/minor axis) may be for example, 1.95 or more. The lengths of the major and minor axes of the spherical particles and the flake-shaped particles may be measured from images obtained by scanning first and second directional cross-sections cut from the center portion of the multilayer electronic component in the third direction with the scanning electron microscope (SEM).

The resin included in the second electrode layers 131*b* and 132*b* may ensure bonding properties and serve as shock absorbers. The resin included in the second electrode layers 131*b* and 132*b* may have bonding properties and shock absorption properties, and the resin is not particularly limited as long as the resin may be mixed with the conductive metal particles to make a paste, and may include, for example, an epoxy-based resin.

Additionally, the second electrode layers 131*b* and 132*b* may include a plurality of second conductive metal particles, an intermetallic compound, and a resin. The intermetallic compound may be included to further improve electrical connectivity with the first electrode layers 131*a* and 132*a*. The intermetallic compound may serve to improve electrical connectivity by connecting a plurality of metal particles, and may serve to surround the plurality of metal particles and connect the metal particles to each other.

In this case, the intermetallic compound may include a metal having a melting point lower than a curing temperature of the resin. That is, because the intermetallic compound includes the metal having the melting point lower than the curing temperature of the resin, the metal having the melting point lower than the curing temperature of the resin is melted during a drying and curing process, and an intermetallic compound with a portion of the metal particles is formed to surround the metal particle. In this case, the intermetallic compound may preferably include a low melting point metal of 300° C. or lower.

For example, the intermetallic compound may include Sn, which has a melting point of 213 to 220° C. Sn is melted during the drying and curing process, and the melted Sn wets high melting point metal particles such as Ag, Ni or Cu through capillary action, and reacts with some of Ag, Ni or Cu metal particles to form intermetallic compounds such as $Ag_3Sn$, $Ni_3Sn_4$, $Cu_6Sn_5$ and $Cu_3Sn$. Ag, Ni or Cu that did not participate in the reaction remain in the form of metal particles.

Accordingly, the plurality of second conductive metal particles may include one or more of Ag, Ni, and Cu, and the intermetallic compound may include one or more of $Ag_3Sn$, $Ni_3Sn_4$, $Cu_6Sn_5$ and $Cu_3Sn$.

The plating layers 131*c* and 132*c* may serve to improve mounting characteristics.

The types of plating layers 131*c* and 132*c* are not particularly limited, and in the drawings, only a single layer of plating layers 131*c* and 132*c* are shown, but the present disclosure is not limited thereto, and the plating layers 131*c* and 132*c* may be a single layer of plating layers 131*c* and 132*c* including one or more of nickel (Ni), tin (Sn), palladium (Pd) and alloys thereof, or may be formed of a plurality of layers.

For more specific examples of the plating layers 131*c* and 132*c*, the plating layers 131*c* and 132*c* may be Ni plating layers or Sn plating layers, and may be in the form in which a Ni plating layer and a Sn plating layer are sequentially formed on the electrode layer, and may be in the form in which the Sn plating layer, the Ni plating layer, and the Sn plating layer are formed sequentially. Additionally, the plating layers 131*c* and 132*c* may include a plurality of Ni plating layers and/or a plurality of Sn plating layers.

There is no need to specifically limit the size of the multilayer electronic component 100.

However, in order to achieve both miniaturization and high capacitance, the thickness of the dielectric layer and internal electrode must be thinned to increase the number of stacked layers, and thus, the effect according to the present disclosure may be more noticeable in the multilayer electronic component 100 having a size of 1005 (length×width: 1.0 mm×0.5 mm) or less.

Hereinafter, the present disclosure will be described in more detail through examples but this is intended to help the specific understanding of the invention, and the scope of the present invention is not limited by an example embodiment.

Example Embodiment

In Comparative Example, a multilayer electronic component including a cover portion and a side margin portion was manufactured, and a multilayer electronic component without adding gallium (Ga) to the cover portion and the side margin portion was manufactured.

In Example, a multilayer electronic component was manufactured in the same manner as in Comparative Example, except that 1 mole or less of gallium (Ga) was added to the cover portion and the side margin portion. In this case, the multilayer electronic component was manufactured so that a ratio (B/A) of the number of moles (B) of gallium (Ga) compared to 100 moles of titanium (Ti) included in the side margin portion to the number of moles (A) of gallium (Ga) compared to 100 moles of titanium (Ti) included in the cover portion satisfies $1.5 \leq B/A$.

The various comparative examples and examples below are not descriptions of a single multilayer electronic component, but correspond to the comparative example and the example that satisfy the above-described manufacturing method.

Figure 7A:
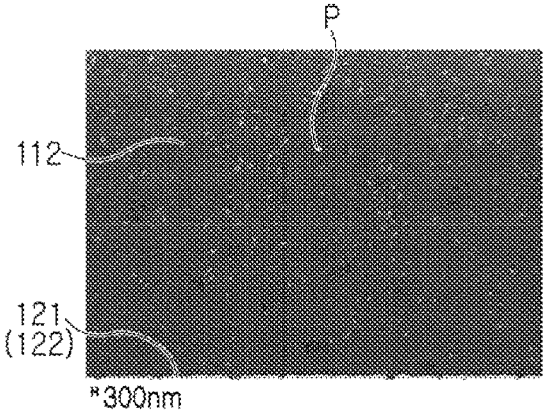
FIGS. 7A and 7B are images obtained by capturing regions M1 and M2 in FIG. 6 with a scanning electron microscope (SEM) in Comparative Example.
Figure 7B:
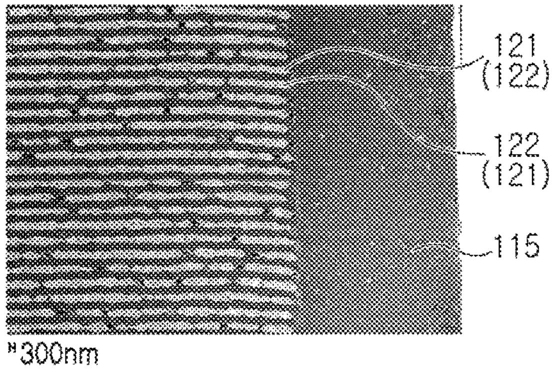
Figure 7C:
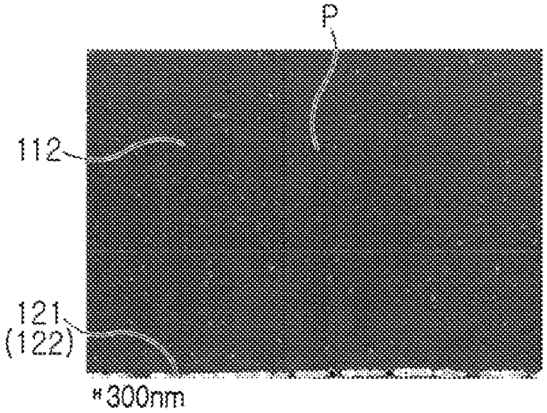
FIGS. 7C and 7D are images obtained by capturing regions M1 and M2 in FIG. 6 using the scanning electron microscope (SEM) according to Example.
Figure 7D:
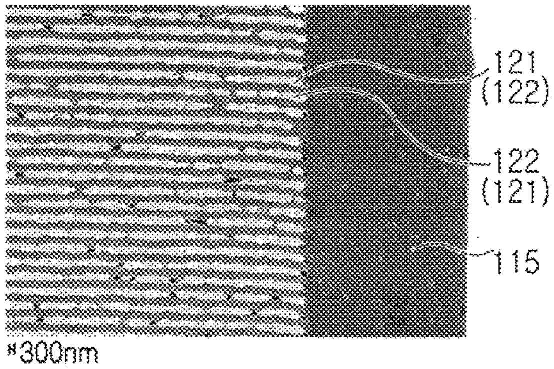

FIGS. 7A and 7B are images obtained by capturing regions M1 and M2 in FIG. 6 with a scanning electron microscope (SEM) in Comparative Example 1, and FIGS. 7C and 7D are images obtained by capturing regions M1 and M2 in FIG. 6 using the scanning electron microscope (SEM) according to Example 1.

More specifically, FIG. 7A is an image of first and third directional cross-sections of a first cover portion captured using the scanning electron microscope (SEM) in Comparative Example 1, and the number of pores (P) including in 547 $\mu m^2$ of the cross-section of the first cover portion was measured to be 229. FIG. 7B is an image of first and third directional cross-sections of a second side margin portion captured with the scanning electron microscope (SEM) in Comparative Example 1, and the number of pores (P) included in 190 $\mu m^2$ of the cross-section of the second side margin portion was measured to be 45.

FIG. 7C is an image of first and third directional cross-sections of a first cover portion captured with the scanning electron microscope (SEM) in Example 1, and the number of pores (P) included in 547 $\mu m^2$ of the cross-section of the first cover portion was measured to be 110. FIG. 7D is an image of first and third directional cross-sections of a second side margin portion captured with the scanning electron microscope (SEM) in Example 1, and the number of pores (P) included in 190 $\mu m^2$ of the cross-section of the second side margin portion was measured to be 39.

From this, it can be seen that when the ratio (B/A) of the number of moles (B) of gallium (Ga) to 100 moles of titanium (Ti) included in the side margin portion to the number of moles (A) of gallium (Ga) compared to 100 moles of titanium (Ti) included in the cover portion satisfies 1.5≤B/A, the number of pores (P) included in the cover portion and the side margin portion decreases.

Figure 8A:
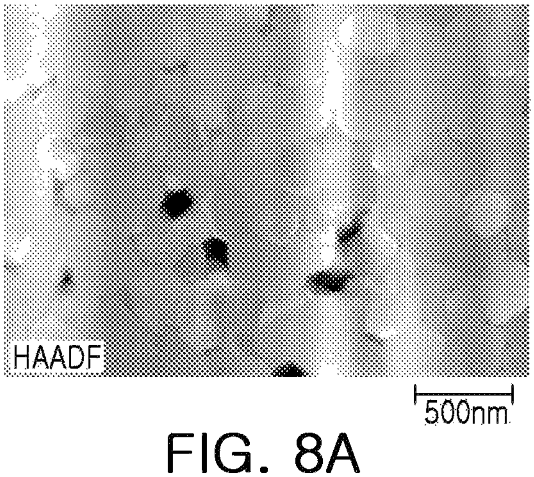
FIG. 8A is an image of a cross-section of a cover portion of Comparative Example captured in an high-angle annular dark-field imaging (HAADF) mode of a scanning electron microscope (SEM)
Figure 8B:
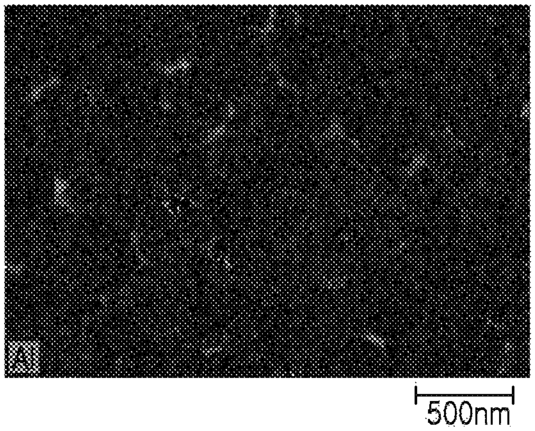
FIG. 8B is an image obtained by mapping an aluminum (Al) element by performing EDS analysis in the region in FIG. 8A.
Figure 8C:
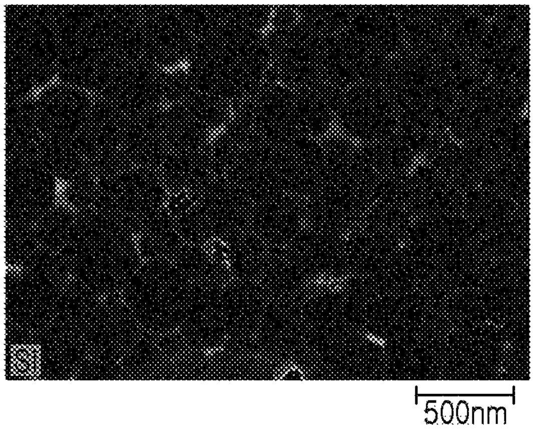
FIG. 8C is an image obtained by mapping a silicon (Si) element by performing the EDS analysis in the region in FIG. 8A.

In Comparative Example 2, FIG. 8A is an image of first and third directional cross-sections of a first cover portion captured in an HAADF mode of a scanning electron microscope (SEM), FIG. 8B is an image obtained by mapping an aluminum (Al) element by performing EDS analysis in the region in FIG. 8A, and FIG. 8C is an image obtained by mapping a silicon (Si) element by performing the EDS analysis in the region in FIG. 8A.

Figure 9A:
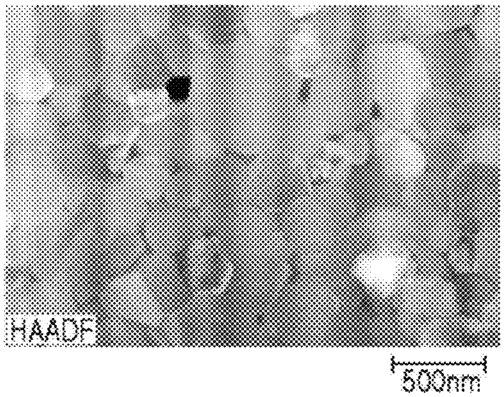
FIG. 9A is an image of a cross-section of a cover portion of Example captured in an HAADF mode of a scanning electron microscope (SEM)
Figure 9B:
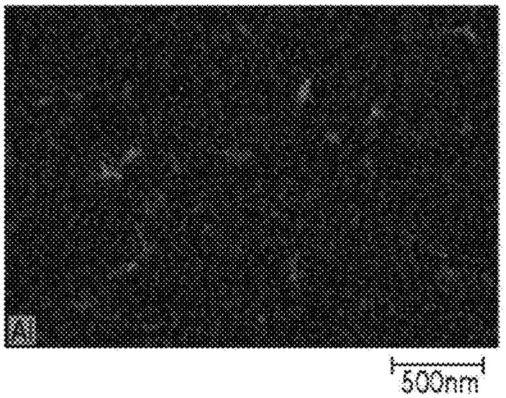
FIG. 9B is an image obtained by mapping an aluminum (Al) element by performing EDS analysis in the region in FIG. 9A.
Figure 9C:
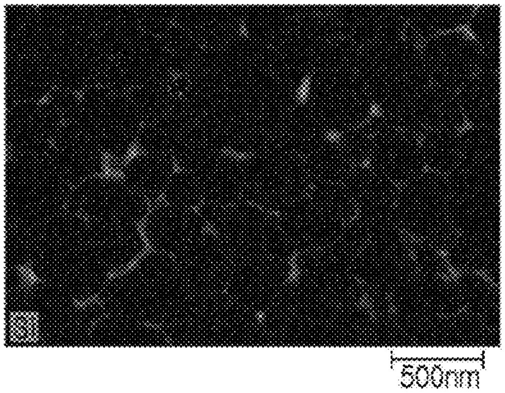
FIG. 9C is an image obtained by mapping a silicon (Si) element by performing EDS analysis in the region in FIG. 9A.
Figure 9D:
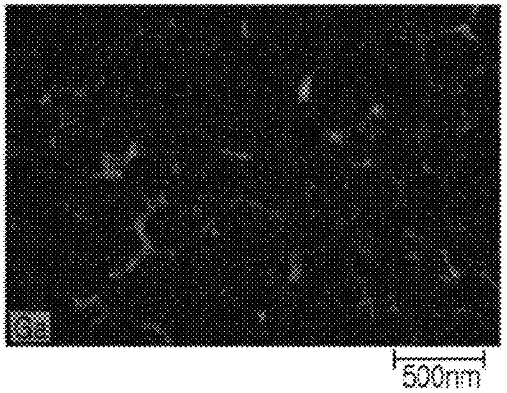
FIG. 9D is an image obtained by mapping a gallium (Ga) element by performing EDS analysis in the region in FIG. 9A.

In Example 2, FIG. 9A is an image of a cross-section of a cover portion captured in an HAADF mode of a scanning electron microscope (SEM), FIG. 9B is an image obtained by mapping an aluminum (Al) element by performing EDS analysis in the region in FIG. 9A, FIG. 9C is an image obtained by mapping a silicon (Si) element by performing EDS analysis in the region in FIG. 9A, and FIG. 9D is an image obtained by mapping a gallium (Ga) element by performing EDS analysis in the region in FIG. 9A.

Figure 10A:
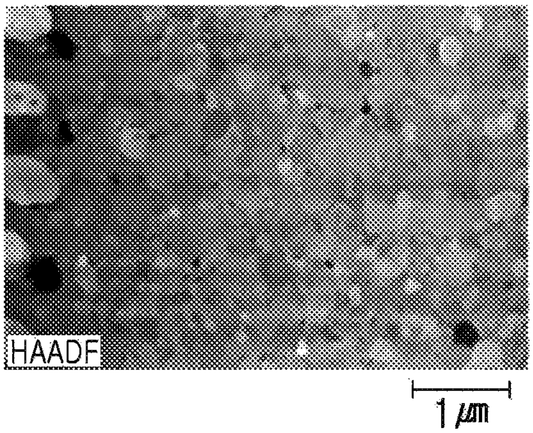
FIG. 10A is an image of a cross-section of a side margin portion of Comparative Example captured in an HAADF mode of a scanning electron microscope (SEM)
Figure 10B:
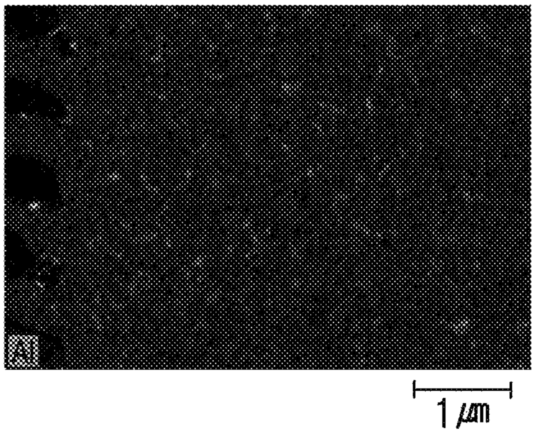
FIG. 10B is an image obtained by mapping an aluminum (Al) element by performing EDS analysis in the region in FIG. 10A.
Figure 10C:
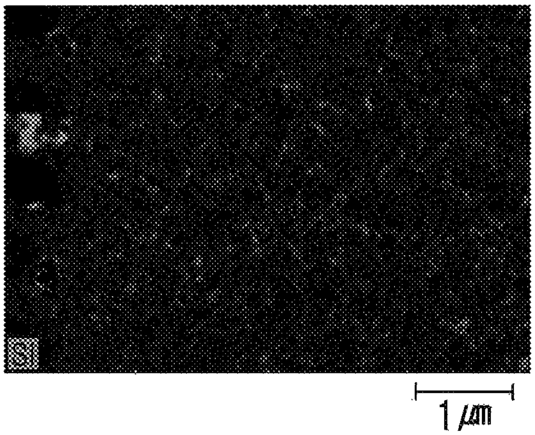
FIG. 10C is an image obtained by mapping a silicon (Si) element by performing EDS analysis in the region in FIG. 10A.

In Comparative Example 3, FIG. 10A is an image of a cross-section of a side margin portion captured in an HAADF mode of a scanning electron microscope (SEM), FIG. 10B is an image obtained by mapping an aluminum (Al) element by performing EDS analysis in the region in FIG. 10A, and FIG. 10C is an image obtained by mapping a silicon (Si) element by performing EDS analysis in the region in FIG. 10A.

Figure 11A:
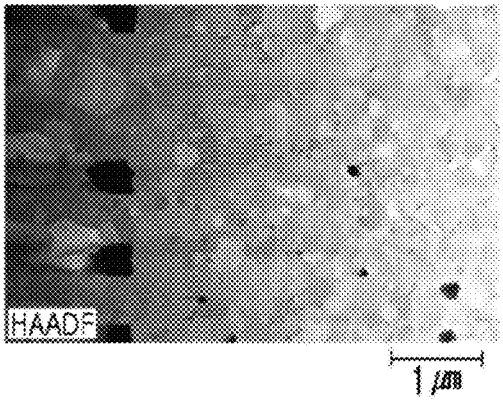
FIG. 11A is an image of a cross-section of a side margin portion of Example captured in a HAADF mode of a scanning electron microscope (SEM)
Figure 11B:
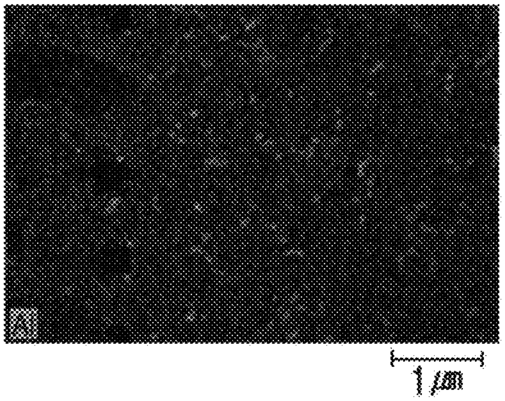
FIG. 11B is an image obtained by mapping an aluminum (Al) element by performing EDS analysis in the region in FIG. 11A.
Figure 11C:
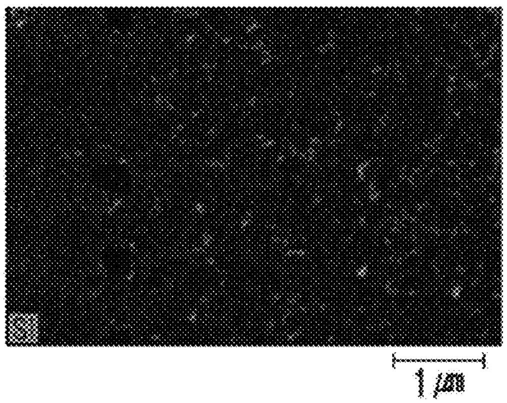
FIG. 11C is an image obtained by mapping a silicon (Si) element by performing EDS analysis in the region in FIG. 11A.
Figure 11D:
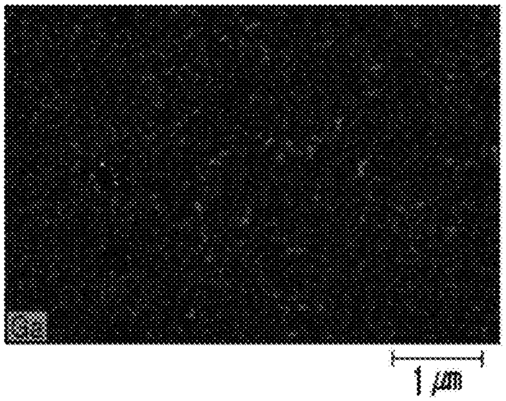
FIG. 11D is an image obtained by mapping a gallium (Ga) element by performing EDS analysis in the region in FIG. 11A.

In Example 3, FIG. 11A is an image of a cross-section of a side margin portion captured in a HAADF mode of a scanning electron microscope (SEM), FIG. 11B is an image obtained by mapping an aluminum (Al) element by performing EDS analysis in the region in FIG. 11A, FIG. 11C is an image obtained by mapping a silicon (Si) element by performing EDS analysis in the region in FIG. 11A, and FIG. 11D is an image obtained by mapping a gallium (Ga) element by performing EDS analysis in the region in FIG. 11A.

From Comparative Examples 2 and 3 and Examples 2 and 3, it may be seen that when gallium (Ga) is included in the cover portion and the side margin portion, gallium (Ga) is disposed in the grain boundaries and the triple point, and it may be seen that since gallium (Ga) is disposed together in a region in which silicon (Si) and aluminum (Al) are detected, gallium (Ga) is included in the secondary phase including silicon (Si) and aluminum (Al).

Next, 20 channels each equipped with 20 sample chips were manufactured for Comparative Examples 4 and 5, and Examples 4 and 5, and moisture resistance reliability evaluation was performed.

Figure 12A:
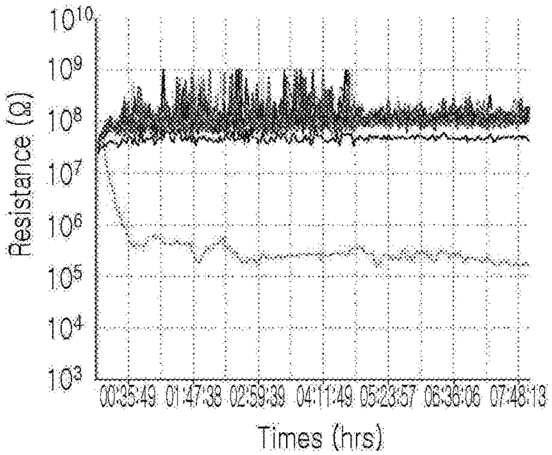
FIGS. 12A and 12B are graphs for evaluating moisture resistance reliability of Comparative Example.
Figure 12B:
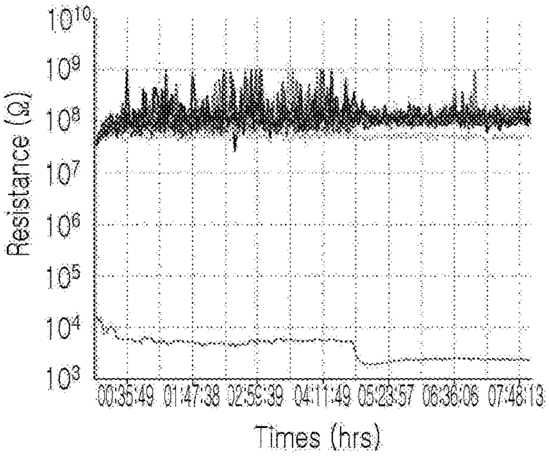
Figure 12C:
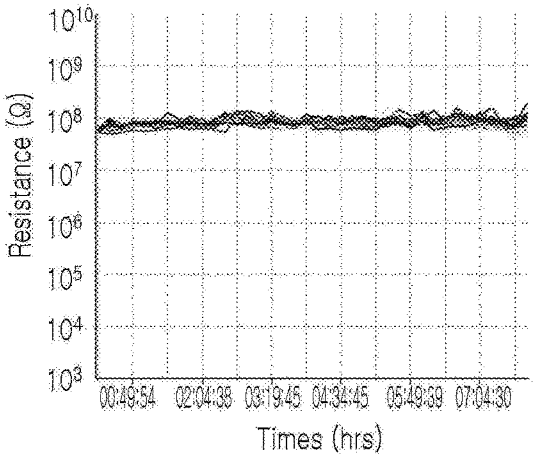
FIGS. 12C and 12D are moisture resistance reliability evaluation graphs of Example.
Figure 12D:
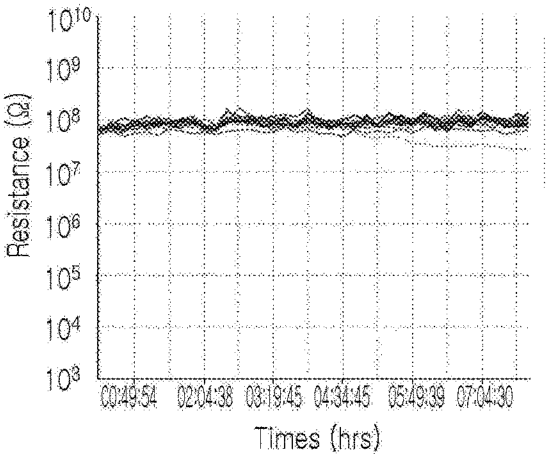

FIG. 12A is a moisture resistance reliability evaluation graph of Comparative Example 4, and FIG. 12B is a moisture resistance reliability evaluation graph of Comparative Example 5. FIG. 12C is a moisture resistance reliability evaluation graph of Example 4, and FIG. 12D is a moisture resistance reliability evaluation graph of Example 5.

In the moisture resistance reliability evaluation, when a rated voltage of 1.0 Vr is applied for 8 hours at a temperature condition of 85° C. and a relative humidity condition of 85%, a channel whose insulation resistance (IR) value is reduced to 105Ω or less were evaluated to be defective.

For Comparative Example 4 and Comparative Example 5, there was one channel each that was determined to be defective, but for Examples 4 and 5, there were no channels determined to be defective, and no channels having lower insulation resistance (IR) compared to initial insulation resistance ($IR_0$) were measured.

From this, it may be seen that when the ratio (B/A) of the number of moles (B) of gallium (Ga) to 100 moles of titanium (Ti) included in the side margin portion to the number of moles (A) of gallium (Ga) compared to 100 moles of titanium (Ti) included in the cover portion satisfies 1.5≤B/A, the moisture resistance reliability of the multilayer electronic component is improved.

Figure 13:
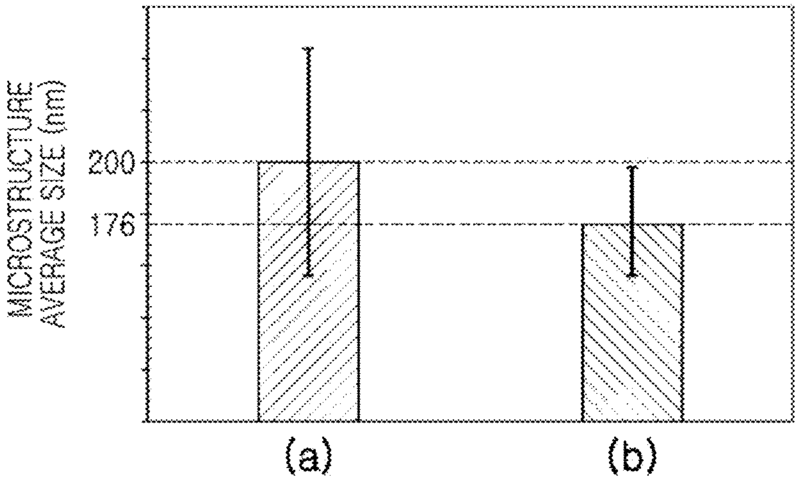
FIG. 13 is a graph of a grain microstructure size of (a) Comparative Example and (b) Example.

FIG. 13 is a graph of a grain microstructure size of (a) Comparative Example 6 and (b) Example 6.

The grain microstructure refers to grains included in some regions of the first and third directional cross-sections of the first cover portion of each test example. In FIG. 13, a bar graph represents an average size of the microstructure, and an 'I'-shaped straight line graph represents the distribution of grain sizes.

An average value of the grains included in some regions of Comparative Example 6 was 200 nm, and an average value of the grains included in some regions of Example 7 was 176 nm. Additionally, the size distribution of the grains was measured to be wider in the comparative example than in the example.

From this, it may be seen that a ratio (B/A) of the number of moles (B) of gallium (Ga) to 100 moles of titanium (Ti) included in the side margin portion to the number of moles (A) of gallium (Ga) compared to 100 moles of titanium (Ti) included in the cover portion satisfies 1.5≤B/A, the size of the grains is reduced, and the size distribution is also improved, from which it may be predicted that the breakdown voltage (BDV) due to an electric field concentration phenomenon will be improved.

Although the example embodiment of the present disclosure has been described in detail above, the present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

In addition, the expression 'an example embodiment' used in the present disclosure does not mean the same embodiment, and is provided to emphasize and explain different unique characteristics. However, the embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

In the present disclosure, the terms are merely used to describe a specific embodiment, and are not intended to limit the present disclosure. Singular forms may include plural forms as well unless the context clearly indicates otherwise.

What is claimed is:

1. A multilayer electronic component, comprising:

a body including a capacitance formation portion including a dielectric layer and internal electrodes alternately disposed with the dielectric layer in a first direction, and a cover portion disposed on both end surfaces of the capacitance formation portion in the first direction, the body including first and second surfaces opposing each other in the first direction, third and fourth surfaces connected to the first and second surfaces and opposing each other in a second direction, and fifth and sixth surfaces connected to the first to fourth surfaces and opposing each other in a third direction;

an external electrode disposed on the third and fourth surfaces; and a side margin portion disposed on the fifth and sixth surfaces, wherein the cover portion and the side margin portion include titanium (Ti) and gallium (Ga), and a ratio (B/A) of a number of moles (B) of gallium (Ga) compared to 100 moles of titanium (Ti) included in the side margin portion to a number of moles (A) of gallium (Ga) compared to 100 moles of titanium (Ti) included in the cover portion satisfies 1.5≤B/A.

2. The multilayer electronic component according to claim 1, wherein 0 mole<B≤1.0 mole is satisfied.

3. The multilayer electronic component according to claim 1, wherein 0 mole<A≤1.0 mole is satisfied.

4. The multilayer electronic component according to claim 1, wherein the dielectric layer is free of gallium (Ga).

5. The multilayer electronic component according to claim 4, wherein 0 mole<A≤1.0 mole is satisfied.

6. The multilayer electronic component according to claim 5, wherein at least one of the cover portion and the side margin portion includes a secondary phase including gallium (Ga).

7. The multilayer electronic component according to claim 6, wherein at least one of the cover portion and the side margin portion includes a plurality of grains, a grain boundary disposed between adjacent grains, and a triple point disposed in a point at which three or more grain boundaries are in contact with each other, and the secondary phase is disposed in the triple point.

8. The multilayer electronic component according to claim 7, wherein the grain boundary includes a region in which an atomic percentage (at %) of gallium (Ga) is 2.0 at % or more, and an average atomic percentage (at %) of gallium (Ga) in the grain boundary is 0.5 at % or more and 2.0 at % or less.

9. The multilayer electronic component according to claim 1, wherein when the dielectric layer of the capacitance formation portion is referred to as a first dielectric layer, the cover portion includes a second dielectric layer, and the side margin portion includes a third dielectric layer, and a composition of the first dielectric layer is different from the composition of at least one of the second dielectric layer and the third dielectric layer.

10. The multilayer electronic component according to claim 1, wherein at least one of the cover portion and the side margin portion includes a secondary phase including gallium (Ga).

11. The multilayer electronic component according to claim 10, wherein at least one of the cover portion and the side margin portion includes a plurality of grains, a grain boundary disposed between adjacent grains, and a triple point disposed in a point at which three or more grain boundaries are in contact with each other, and the secondary phase is disposed in the triple point.

12. The multilayer electronic component according to claim 10, wherein the secondary phase further includes silicon (Si).

13. The multilayer electronic component according to claim 1, wherein at least one of the cover portion and the side margin portion includes a plurality of grains and a grain boundary disposed between adjacent grains, and the grain boundary includes gallium (Ga).

14. The multilayer electronic component according to claim 13, wherein the grain boundary includes a region in which an atomic percentage (at %) of gallium (Ga) is 2.0 at % or more.

15. The multilayer electronic component according to claim 13, wherein in the grain boundary, an average atomic percentage (at %) of gallium (Ga) is 0.5 at % or more and 2.0 at % or less.

16. The multilayer electronic component according to claim 1, wherein, in a cross-section of the cover portion in the first and third directions, a number of pores included in 1 $\mu m^2$ is 0.30 or less.

17. The multilayer electronic component according to claim 1, wherein, in a cross-section of the side margin portion in the first and third directions, a number of pores included in 1 $\mu m^2$ is 0.22 or less.

* * * * *